Dec. 18, 1962 S. A. THORNTON 3,069,034
GRAB FOR CANE STALKS AND THE LIKE
Filed Oct. 23, 1959 2 Sheets-Sheet 1

INVENTOR.
Samuel A. Thornton
BY
Brown, Jackson, Boettcher & Dienner
Attys.

Dec. 18, 1962     S. A. THORNTON     3,069,034
GRAB FOR CANE STALKS AND THE LIKE
Filed Oct. 23, 1959     2 Sheets-Sheet 2
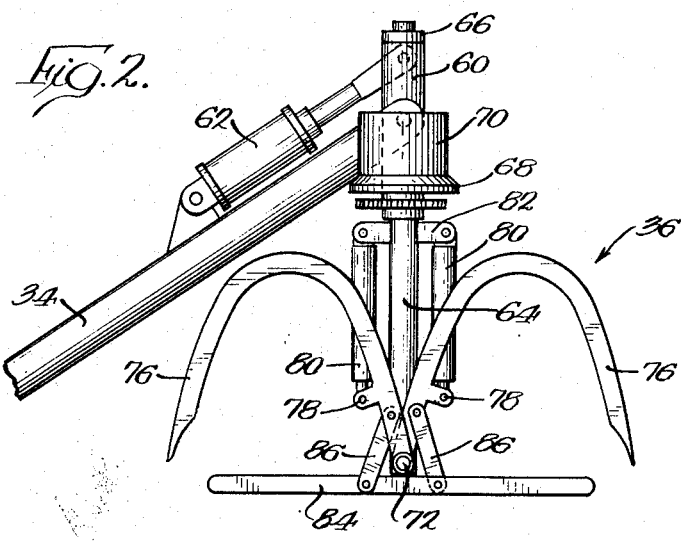
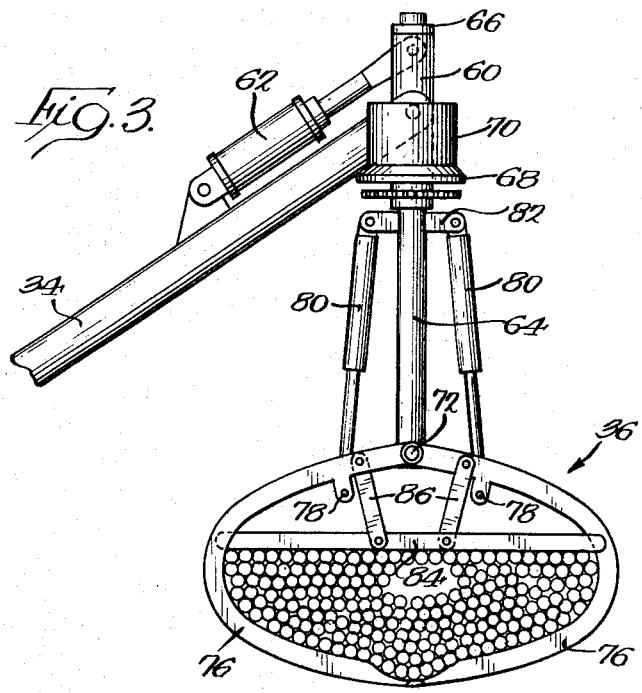
INVENTOR.
Samuel A. Thornton
BY
Brown, Jackson, Boettcher & Dienner
Attys United States Patent Office 3,069,034
Patented Dec. 18, 1962

3,069,034
GRAB FOR CANE STALKS AND THE LIKE
Samuel A. Thornton, P.O. Box 286, Jeanerette, La.
Filed Oct. 23, 1959, Ser. No. 848,292
5 Claims. (Cl. 214—147)

The present invention relates to means for picking up and transferring loads of cane stalks and the like, and particularly, to an improved boom mounted grab for use in conjunction with cane combines and the like for transferring harvested cane from the combine to a transporting vehicle, such as a cane cart. The application is a continuation-in-part of my co-pending application Serial No. 702,996, filed December 16, 1957, now Patent No. 2,974,464.

In my said parent application, I have disclosed a cane combine wherein the harvested cane stalks are accumulated in an upwardly and rearwardly open receptacle located at one side of the combine and disposed at an inclination to horizontal. For removing accumulated stalks from the receptacle, I have provided a grab mounted on a boom which in turn is supported on a mast located to the rear of the receptacle. The boom is adapted to be raised and lowered and to be swung about the axis of the mast for purposes of lowering the grab into the receptacle, lifting a load of stalks out of the receptacle and swinging the load to the side or rear of the combine, at which location the load may be placed into a cart or onto the ground.

One object of the present invention is the provision, in conjunction with the boom and grab above described, of means for pivoting or swiveling the grab relative to the boom in a generally vertical plane, and means for oscillating or rotating the grab relative to the boom in a generally horizontal plane, whereby the jaws of the grab may be disposed perpendicular to the accumulated cane when the grab is lowered into the receptacle and may also be disposed perpendicular to a cart or the ground when depositing a load of cane, and whereby the grab may be disposed with its longitudinal axis parallel to the receptacle and to a cart when being lowered into the same and may be disposed crosswise of the cane rows when depositing a load of stalks on the ground.

More particularly, it is an object of the invention to provide grab means as described including a mounting sleeve pivoted on the boom, means between the boom and the sleeve for swiveling the sleeve relative to the boom, a grab supporting arm journalled in said sleeve, and means between said sleeve and said arm for rotating said arm in said sleeve, whereby the grab may be swiveled and oscillated relative to the boom.

Another object of the invention is to provide an improved grab for cane stalks and the like including means for retaining a load of stalks in the grab even when the load is tilted relative to horizontal, whereby, for example, a load of cane stalks may be lifted out of the aforesaid inclined receptacle in an inclined position without loss of the load or individual stalks.

A further object of the invention is the provision of an improved grab for cane stalks and the like including opposed jaws movable toward and away from one another for engaging beneath and to opposite sides of a load of cane stalks, a constrictor bar movable upwardly and downwardly for engaging the top of the load, and means for moving said jaws toward one another and said constrictor bar downwardly for clamping the load of stalks therebetween.

A still further object of the invention is the provision of an improved grab as above described wherein said jaws are pivotally mounted at one set of ends on a common axis and define substantially a loop in their closed position, said constrictor bar is pivotally connected to opposed ones of the jaws adjacent the pivotal mounting thereof and comprises substantially a chord of said loop, and said means for moving said jaws and said bar comprises means for pivoting said jaws about said axis.

Other objects and advantages of the invention will become apparent in the following detailed description.

Now, in order to acquaint those skilled in the art with the manner of making and using my improved grab, I shall describe, in connection with the accompanying drawings, a preferred embodiment of the grab and a preferred manner of making the same.

In the drawings:

FIGURE 2 is an enlarged fragmentary elevation of the grab means showing the grab in its open position with its longitudinal axis extending transversely of the boom; and FIGURE 3 is a view similar to FIGURE 2 but showing the grab closed about a load of stalks.

Figure 1:
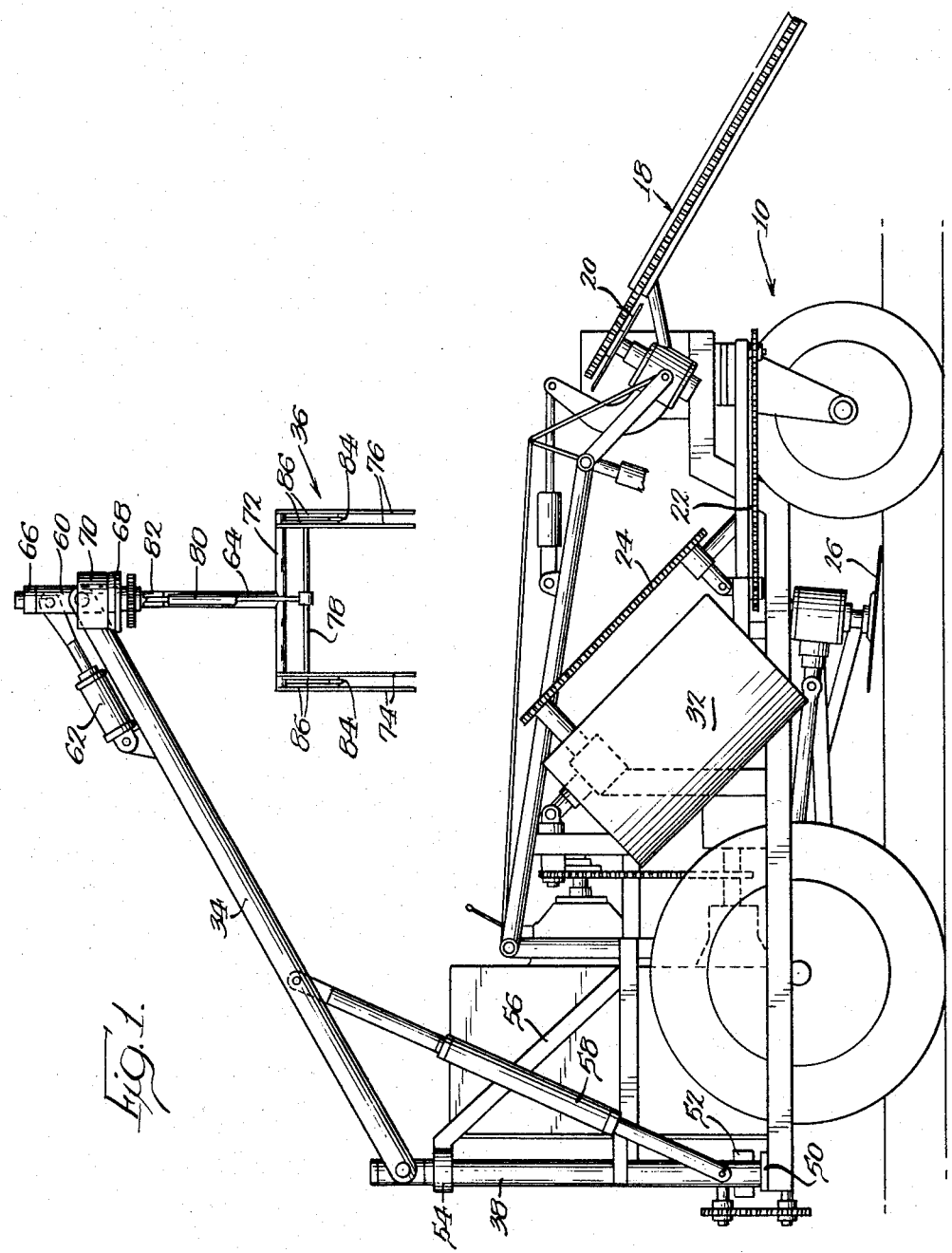
FIGURE 1 is a side elevation of a cane combine including a preferred embodiment of my improved stalk transferring grab means, the grab being shown with its longitudinal axis parallel to the longitudinal axes of the combine and the grab supporting boom.

Referring now to FIGURE 1, the cane combine of my said parent application is illustrated as comprising a wheeled vehicle 10 carrying a suitable source of power for propelling the vehicle and driving the can harvesting means mounted thereon. The harvesting means includes cane stalk gathering means 18 projecting forwardly and downwardly from the front of the vehicle, cane topping means 20 carried and driven by the gathering means, a transport conveyor 22 for receiving the gathered stalks in a straight row, a bottom cutter 26 for severing the stalks at substantially ground level as they pass from the conveyor 22, an elevating conveyor 24 which seizes the stalks just before they are severed and then elevates the same along an inclined path, and a receptacle or box 32 into which the stalks are deposited by the elevating conveyor.

The receptacle 32 includes a bottom wall which is inclined both longitudinally and laterally of the vehicle and a transverse lower end wall. The said inclined bottom wall is aligned adjacent its edge with the elevating conveyor 24 and the said transverse end wall intersects the path of movement of stalks being transported by this conveyor. Consequently, as the severed cane stalks are being elevated by the conveyor 24, they are dragged over the end wall of the box which causes the stalks to move into approximate parallelism with the elevator 24, the elevator then carrying the stalks in such position to the discharge end thereof. At its discharge end, the elevating conveyor releases the stalks substantially parallel to the longitudinal axis of the receptacle and in upwardly spaced relation to the transverse end wall thereof, whereby each stalk is free to gravitate into the receptacle. Due to the inclination of the bottom wall of the receptacle, each stalk rolls about its own axis laterally away from the elevator and also slides longitudinally into abutment with the receptacle end wall. Thus, the severed stalks are deposited and collected in a neat pile in parallel coextensive relation in the receptacle at a readily accessible location spaced laterally from the gathering, topping, transporting and elevating means. The receptacle or box has no upper end wall thus facilitating reception of stalks of any length, and is open at its upper side to facilitate removal therefrom of the stalks.

When a certain amount of cane stalks have been collected or deposited in a neat pile in said readily accessible location on the harvester, i.e., the box 32, a load of stalks may conveniently be transferred to a cane transport vehicle. For this purpose, the combine includes a movable transferring boom 34 carrying an adjustable cane grab 36.

The boom 34 is mounted for horizontal swinging movement about a vertical axis defined by a rotatable supporting mast 38, which is preferably disposed in alignment with the longitudinal axis of the box means or receptacle 32 to best accommodate positioning of the grab 36 in the box. The boom 34 is pivotally mounted on the upper end of the mast to move the grab into and out of the receptacle or box and the grab in turn is adjustably mounted on the outer end of the boom to move into and out of the box with its jaws substantially perpendicular to the bottom wall means of the box and with its axis parallel to the longitudinal axis of the box.

The cane transferring means is particularly distinguished by mounting thereof to swing in an arc of at least 190 degrees and preferably 270 degrees, so that the grab can be moved at least to the side of the vehicle on which the box is mounted and to the rear of the vehicle, and preferably also to the opposite side of the vehicle. In use, the boom 34 and grab 36 are actuated to move the grab into the central portion of the box, which as above described is located to one side of the gathering, cutting and transporting apparatus thereby to facilitate ready and convenient access of the grab to the collected cane. The grab enters the box means, preferably adjacent the upper end thereof to pick up a neat and orderly load of cane in a balanced condition relative to the grab. The boom is then elevated and swung horizontally to position the grab 36 at either side of or centrally behind the harvester and directly over a cane cart or the like whereupon the boom may be lowered and the grab opened to place the load of cane, still in a neat and orderly pile, accurately into the cart. Loading or transferring of cane is repeated in the manner described until one cart has been filled, whereupon the one cart may be hauled away and an empty cart moved into its place. During changing of the carts, the cane simply accumulates in the box means 32 for subsequent loading into the empty cart. In the event of a long delay between substitution of an empty cart for a full cart, neat uniform piles of cane may be transferred by the boom and grab to the ground and accurately positioned across the tops of adjacent, previously cleared rows, either to the side or behind the combine.

From the foregoing, it is apparent that the boom and grab means must be operative to raise and lower the grab, to swing the grab in the aforesaid arc, to tilt the grab for perpendicular entry into the inclined box or into a cart, and to rotate the grab so that it may be disposed with its axis parallel to the box, a cart at the side of the combine, or a cart at the rear of the combine, and with its axis crosswise of the cane rows in the event a load of cane is to be placed on the ground. Also, it is desirable that the boom and grab means be operative to remove loads of cane from the receptacle in an inclined position complementary to the inclination of the box or receptacle, thereby to facilitate clearance of the load from the combine. It is the object of this invention to provide improved boom and grab means accomplishing these results, and to this end, I provide the below described construction.

The boom 34, which comprises an elongate rigid member, is pivotally mounted at its inner end on a horizontal pivot axis provided at the upper end of the supporting mast 38. The mast 38 may suitably comprise a tube or pipe journalled in a bearing 50 provided on the lower portion of the vehicle frame, the mast being operatively connected to a hydraulic or pneumatic motor 52 for pivoting the mast about its axis, whereby the boom may be swung in a horizontal arc of 190 degrees or 270 degrees. Adjacent its upper end, the mast is braced by an encircling collar 54 which is supported above the frame by diagonal struts 56. A hydraulic or pneumatic motor 58 is provided between the mast and the boom for raising and lowering the boom. Preferably, the motor 58 comprises an extensible and contractable piston-cylinder combination pivotally connected at its opposite ends to the lower end of the mast and to an intermediate point on the boom. At its free outer end, the boom pivotally supports a sleeve bearing 60 which is mounted to pivot about a horizontal axis transverse to its longitudinal axis. To effect pivotal movement of the sleeve, a pneumatic or hydraulic motor 62, in the form preferably of a piston-cylinder combination, is mounted between the boom and the sleeve. The sleeve in turn rotatably supports therein a cylindrical arm 64 which extends downwardly through the sleeve and is retained therein by a suitable collar 66. The sleeve carries an outwardly extending bracket 68 on which is mounted a rotary hydraulic or pneumatic motor 70 having a geared or other suitable drive connection with the arm 64, whereby the motor is operable to rotate the arm within the sleeve. At its lower end, the arm mounts a grab supporting pin or shaft 72 which extends transversely of the arm and is secured centrally thereto.

Adjacent its opposite ends, the pin or shaft 72 mounts two pairs of opposed jaws 74—74 and 76—76, each pair of which is movable to a closed position wherein the jaws define substantially a loop, which in the illustrated embodiment is generally elliptical. As viewed in this position (FIGURE 3), the jaws include lower end portions engageable beneath a load of cane stalks, intermediate portions engageable at the side of the load and upper end portions pivotally mounted on the pin 72. Corresponding ones of the jaws of the two pairs are interconnected for conjoint movement by means of connecting bars 78 which parallel the pin 72 and extend from one jaw 74 to the corresponding jaw 76. To effect movement of the jaws, a pair of hydraulic or pneumatic piston-cylinder assemblies 80 are mounted on the arm 64, a mounting bracket 82 being fixed to the arm for the purpose. As illustrated, the motor assemblies 80 are mounted at diametrically opposite sides of the arm generally parallel thereto, each being pivotally connected at its upper end to the bracket 82 and at its lower end to the respective connecting bar 78. By virtue of the motors 80, the jaws of the grab are adapted to be pivotally moved upwardly and outwardly away from one another to open position (FIGURE 2) and downwardly and inwardly toward one another to closed position (FIGURE 3). As is conventional, fluid conduit means (not shown) are provided for conducting fluid under pressure from a suitable source on the vehicle to each of the motors 52, 58, 62, 70 and 80, each supply line including conventional means (not shown) for individually controlling fluid flow to the respective motor. All of the control means are preferably mounted at a loader-operator's station located on the vehicle 10 in such position as to afford the operator a clear view of the box 32 and both sides and the rear of the combine.

In normal use of the cane grab in connection with the combine illustrated, the motor 58 is operated to elevate the boom and the motor 52 is operated to swing the boom into a position over the receptacle 32. The motors 80 are energized to open the jaws of the grab, the motor 70 is operated to dispose the longitudinal axis of the grab in the same vertical plane as the axis of the receptacle, and the motor 62 is operated to tilt the grab to dispose its axis parallel to the axis of the receptacle, i.e., to dispose the jaws of the grab perpendicular to the cane stalks in the receptacle. The boom is then lowered to cause the grab to enter the receptacle, whereupon the jaws are closed by the motors 80 to cause the jaws to close upon a load of stalks, the jaws extending transversely of the stalks and engaging beneath and to opposite sides of the load adjacent the opposite ends of the stalks whereby the load may be picked up by the grab. The motor 58 is then operated to raise the boom and the grab and the motor 52, upon the load clearing the receptacle, is operated to swing the load to the side of the combine. If the load is to be disposed in a cane cart at the side of the combine, the boom is swung about 90 degrees by the motor 52 and raised by the motor 58 until the grab is over the cart. The motor 62 is operated to dispose the load of stalks parallel to the cart, i.e., horizontal, and the motor 70 is operated to turn the load about 90 degrees to a position wherein the stalks are parallel to the longitudinal axis of the cart, whereupon the boom is lowered to lower the grab and its load into the cart. The grab is then opened to deposit the load in the cart, the operating motors facilitating deposit of the load in any desired place in the cart. If the cart were centrally behind the combine, the boom would be swung about 190 degrees and the grab would be rotated only slightly. Otherwise, the operation would be the same. Similarly, if the boom were swung 270 degrees to be disposed at the opposite side of the cart, the operation would be essentially the same as above described. In the event an empty cart were not available, the load could be placed on the ground to either side of or behind the combine, the motors being suitably operated, as is apparent from the foregoing, to lower the load of stalks to the ground in a horizontal position with the stalks extending across the tops of adjacent cane rows. By so placing the load, the stalks are not dropped into the cane trash that accumulates between rows or into the muddy furrows between rows, and the stalks are retained in a neat pile to be picked up subsequently.

In the transferring of the load in the manner above described, it is noted that the load is initially removed from the inclined box 32. With an ordinary cane grab, wherein the stalks are relatively unrestrained in a longitudinal direction and would slide out of the grab if the grab were tilted, it would be necessary to impart to the grab a primary movement comprising a combination of raising the boom and tilting the grab toward horizontal position, so as to have the load horizontal or nearly so when it cleared the box. However, such movements require considerable care, with consequent slow handling, and the make-up of the combine does not facilitate such operation. Accordingly, it would be advantageous if the load could be removed from the box at substantially the same inclination as the box, i.e., about 45 degrees to horizontal.

To this end, I provide an improved grab including means for clamping the load within the jaws and for retaining the stalks against longitudinal movement. Specifically, in the preferred embodiment of the grab, I provide a pair of longitudinally spaced transverse constrictor bars 84 operable to exert a downward pressing force on the load of stalks within the jaws of the grab adjacent the opposite ends of the load. Each bar 84 comprises simply a rigid cross bar defining substantially a chord of the loop defined by the jaws 74 and 76 in the closed position of the grab. Each bar is preferably disposed between or at least adjacent the two jaws of the respective pairs and is operative therewith and thereby for upward and downward movement. In the disclosed embodiment of the invention, each bar is suspended from the jaws of the respective pair by a pair of links 86 which are pivotally connected at one set of ends to the bar at opposite sides of the center thereof and at their other set of ends to the jaws adjacent but in outwardly spaced relation to the jaw mounting pin or shaft 72. Consequently, as the jaws are swung upwardly and outwardly away from one another, the constrictor bars are moved upwardly therewith, and when the jaws are swung downwardly and inwardly toward one another, the constrictor bars are moved downwardly therewith. In use then, as the jaws close beneath and to opposite sides of a load of stalks, the bars 84 are pressed downwardly onto the top of the load positively to clamp the load within the jaws between the jaws and the bars. Thus, the load can be removed from the inclined receptacle or box 32 at its initial inclination, or even at an increased inclination if that will facilitate the operation, all without loss of the load or individual stalks. Also, since the load is fixedly retained in the grab, swing speed of the boom may be increased, again without loss of the load. This greatly facilitates use and operation of the grab and contributes to the speed, efficiency and neatness of the harvesting operation.

It is, of course, apparent that the improved grab means of the invention may be employed alone or in conjunction with other apparatus than the illustrated combine, but the combine serves as a good example of the capabilities of use of the improved grab, and in particular, shows that the objects of this invention are all attained in a convenient, economic and practical manner.

While I have shown and described what I regard to be the preferred embodiment of my invention, it is to be appreciated that various changes, rearrangements and modifications may be made therein without departing from the scope of the invention, as defined by the appended claims.

I claim:

1. A grab for cane stalks and the like comprising opposed jaws movable toward one another for engaging beneath and to opposite sides of a load of stalks, means adjacent the upper extremities of said jaws for reducing the cross-sectional load area within said jaws and compressing a load of stalks within said jaws, and means for moving said jaws toward one another and for moving said compressing means downwardly relative to the jaws for clamping a load of stalks within said jaws.

2. A grab for cane stalks and the like comprising opposed jaws, means for moving said jaws downwardly and inwardly toward one another and upwardly and outwardly away from one another for respectively embracing and releasing a load, and a constrictor bar operatively connected to said jaws for downward and upward movement therewith and relative thereto, said jaws being movable downwardly and inwardly toward one another for embracing a load of stalks and said constrictor bar being movable downwardly relative to said jaws into the area within the jaws for engaging the top of the embraced load and clamping the load within the jaws.

3. A grab for cane stalks and the like comprising opposed jaws including lower end portions for engaging beneath a load of stalks and intermediate portions for engaging opposite sides of the load, means pivotally mounting said jaws adjacent their upper ends, means for pivotally moving said jaws downwardly and inwardly toward one another and upwardly and outwardly away from one another for respectively embracing and releasing a load, a constrictor bar, and link means pivotally connecting said bar with said jaws adjacent the upper ends thereof for downward and upward movement therewith, said bar when the jaws are moved downwardly and inwardly being disposed below said pivotal mounting means for engaging with the top of a load and clamping the same within the jaws.

4. A grab for cane stalks and the like comprising opposed jaws movable to a closed position wherein they define substantially a loop, a pin pivotally connecting said jaws at the upper side of the loop, a link pivotally connected to each jaw adjacent but in spaced relation to said pin, a constrictor bar pivotally connected to said links and suspended thereby from said jaws, said bar comprising substantially a chord of the said loop, and means for pivotally moving said jaws outwardly and upwardly away from one another to an open position, whereby said bar is moved upwardly, and for pivotally moving said jaws downwardly and inwardly toward one another to said closed position, whereby said bar is moved downwardly, said jaws in the closed position thereof being engageable beneath and to opposite sides of a load of stalks and said bar being engageable with the top of the load to clamp the same within said jaws.

5. A grab for cane stalks and the like comprising, in combination, a boom having a free outer end, means for moving the outer end of said boom vertically and for swinging the boom horizontally, a sleeve pivotally mounted on the outer end of said boom on a horizontal axis transverse to its own axis, an arm journalled in said sleeve and depending therefrom, a pin connected to the lower end of said arm and extending transversely thereof, opposed jaws pivotally mounted on said pin and movable to a closed position wherein they depend from said pin and define substantially a closed loop, a link pivotally connected to each jaw adjacent but in spaced relation to said pin, a constrictor bar pivotally connected to said links and suspended thereby from said jaws, said bar comprising substantially a chord of the said loop, means extending between said arm and said jaws for pivotally moving said jaws outwardly and upwardly away from one another to an open position, whereby said bar is moved upwardly, and for pivotally moving said jaws downwardly and inwardly toward one another to said closed position, whereby said bar is moved downwardly, said jaws in the closed position thereof being engageable beneath and to opposite sides of a load of stalks and said bar being engageable with the top of the load to clamp the same within said jaws, means between said arm and said sleeve for rotating said arm, said pin and said jaws about the axis of said arm, and means between said boom and said sleeve for pivoting said sleeve, said arm, said pin and said jaws about the pivot axis of said sleeve, whereby the jaws may be opened and closed, raised and lowered, swung horizontally, oscillated and tilted for picking up and depositing loads of stalks in substantially any location desired.

References Cited in the file of this patent

UNITED STATES PATENTS

| | | |
|---|---|---|
| 1,307,009 | Joy | June 17, 1919 |
| 2,591,431 | Henggeler | Apr. 1, 1952 |
| 2,676,837 | Wagner et al. | Apr. 27, 1954 |
| 2,696,926 | Squires et al. | Dec. 14, 1954 |
| 2,765,939 | Hellerud | Oct. 9, 1956 |
| 2,770,379 | Przyblyski | Nov. 13, 1956 |
| 2,788,143 | La Tendresse | Apr. 9, 1957 |
| 2,812,070 | Delzer | Nov. 5, 1957 |
| 2,962,177 | Pridgeon | Nov. 29, 1960 |

FOREIGN PATENTS

| | | |
|---|---|---|
| 185,588 | Great Britain | Sept. 14, 1922 |
| 1,132,234 | France | Oct. 29, 1956 |
| 218,749 | Australia | Oct. 31, 1958 |